(12) United States Patent
Gómez Vanegas et al.

(10) Patent No.: US 8,598,452 B2
(45) Date of Patent: Dec. 3, 2013

(54) ELECTRIC ENERGY DISTRIBUTION POLE WITH INCORPORATED GROUND SYSTEM

(75) Inventors: Gustavo Alfonso Gómez Vanegas, Bogotá (CO); Luis Eduardo Vargas Rodríguez, Bogotá (CO); Milton Fredy Salgado Ramírez, Bogotá (CO)

(73) Assignee: Codensa S.A. ESP, Bogotá (CO)

( * ) Notice: Subject to any disclaimer, the term of this patent is extended or adjusted under 35 U.S.C. 154(b) by 29 days.

(21) Appl. No.: 13/133,363

(22) PCT Filed: Dec. 9, 2009

(86) PCT No.: PCT/IB2009/055631
§ 371 (c)(1),
(2), (4) Date: Aug. 8, 2011

(87) PCT Pub. No.: WO2010/067317
PCT Pub. Date: Jun. 17, 2010

(65) Prior Publication Data
US 2012/0018213 A1    Jan. 26, 2012

(30) Foreign Application Priority Data

Dec. 11, 2008  (CO) ................................ 08-131.626

(51) Int. Cl.
*H02G 7/00* (2006.01)

(52) U.S. Cl.
USPC ........................ 174/45 R; 174/5 SG; 174/51

(58) Field of Classification Search
USPC ............... 174/1–6, 40 CC, 51, 78, 5 SG, 5 R; 361/117, 118; 439/92, 98, 100; 52/298
See application file for complete search history.

(56) References Cited

U.S. PATENT DOCUMENTS

| | | | | |
|---|---|---|---|---|
| 4,878,160 A | * | 10/1989 | Reneau et al. | 362/269 |
| 5,586,742 A | * | 12/1996 | Carter | 248/545 |
| 5,609,748 A | * | 3/1997 | Kotowski et al. | 205/734 |
| 6,557,482 B1 | * | 5/2003 | Doty et al. | 116/22 A |
| 7,027,008 B2 | * | 4/2006 | Baker | 343/890 |
| RE39,093 E | * | 5/2006 | Savoca | 362/431 |
| 7,059,096 B2 | * | 6/2006 | Kuebler et al. | 52/838 |
| 7,316,863 B2 | * | 1/2008 | Sato | 429/158 |
| 7,737,359 B2 | * | 6/2010 | Sexton et al. | 174/36 |
| 7,874,126 B2 | * | 1/2011 | Fournier | 52/843 |

FOREIGN PATENT DOCUMENTS

| | | |
|---|---|---|
| JP | 48-112991-01 | 12/1973 |
| JP | 52-105347 | 8/1977 |
| JP | 11-122766 | 4/1999 |
| JP | 11-122767 | 4/1999 |
| JP | 2006-296113 | 10/2006 |

* cited by examiner

*Primary Examiner* — Boris L. Chervinsky
*Assistant Examiner* — Pete Lee
(74) *Attorney, Agent, or Firm* — Merchant & Gould P.C.

(57) ABSTRACT

The present invention is oriented to solving existing problems in the ground systems of aerial networks of electric energy distribution, providing a pole with an incorporated ground system. Said pole has a ground lead embedded in its structure, and two connection terminal boards fitted in the upper and lower sections. This ground system completely avoids the subtraction of the lead, is effective in the grounding and ensures the efficient performance of the electrical distribution system by guaranteeing an effective connection to the ground system with operation, protection and control elements that are installed in the distribution network.

6 Claims, 10 Drawing Sheets

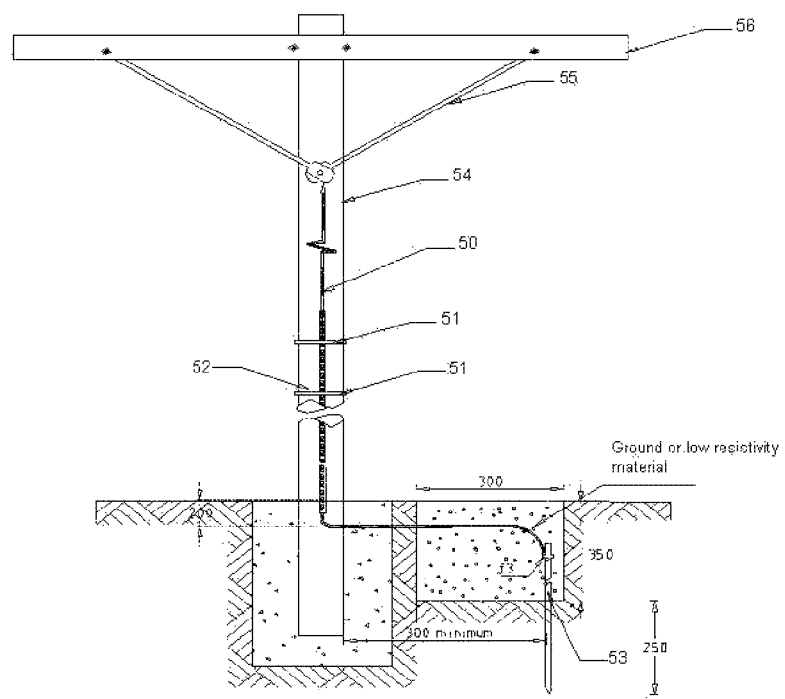
FIGURE Nº1

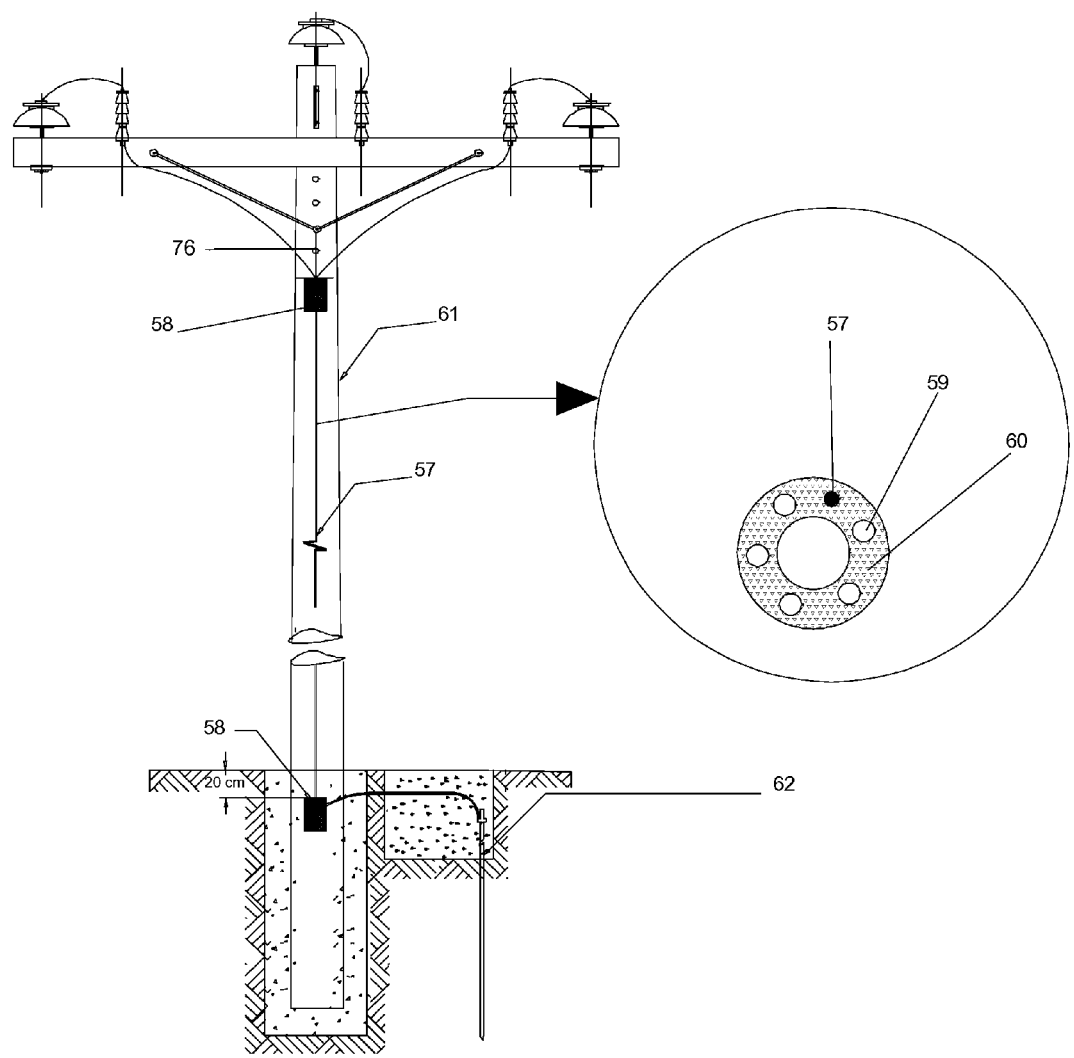
FIGURE N° 2

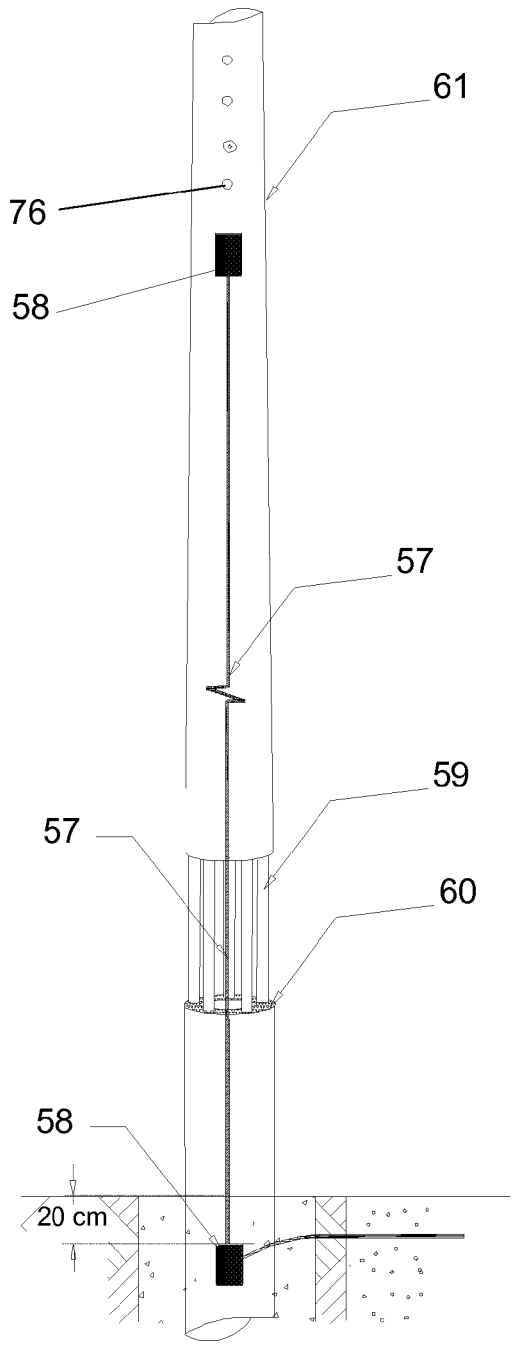
FIGURE N° 3

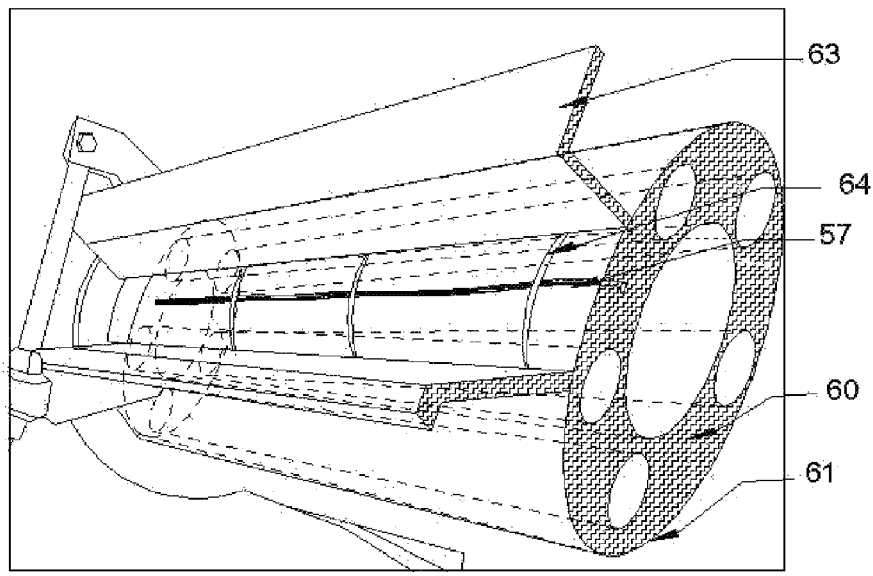
FIGURE Nº 4
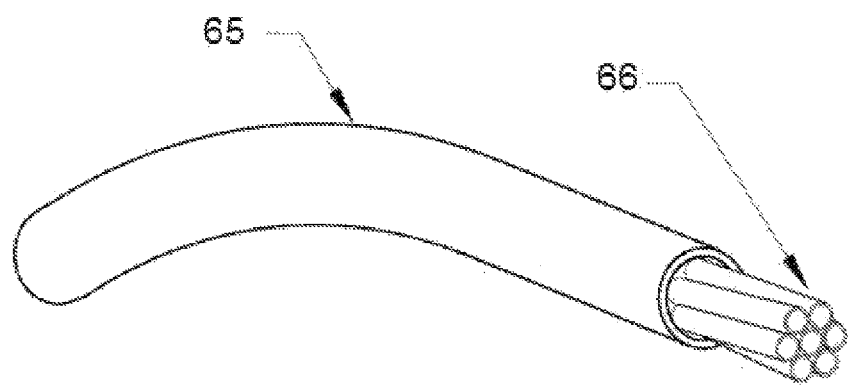
FIGURE Nº 5

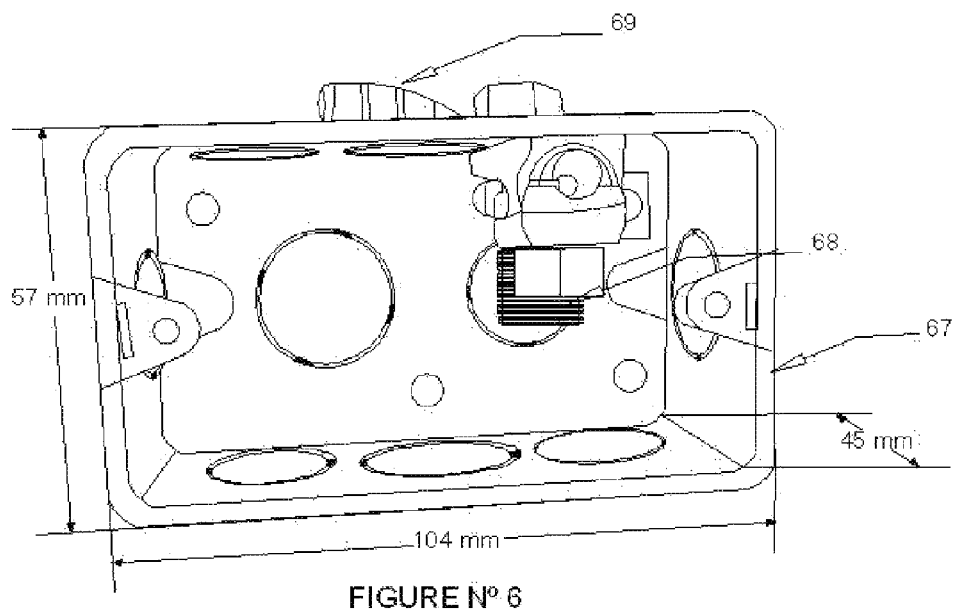
FIGURE Nº 6

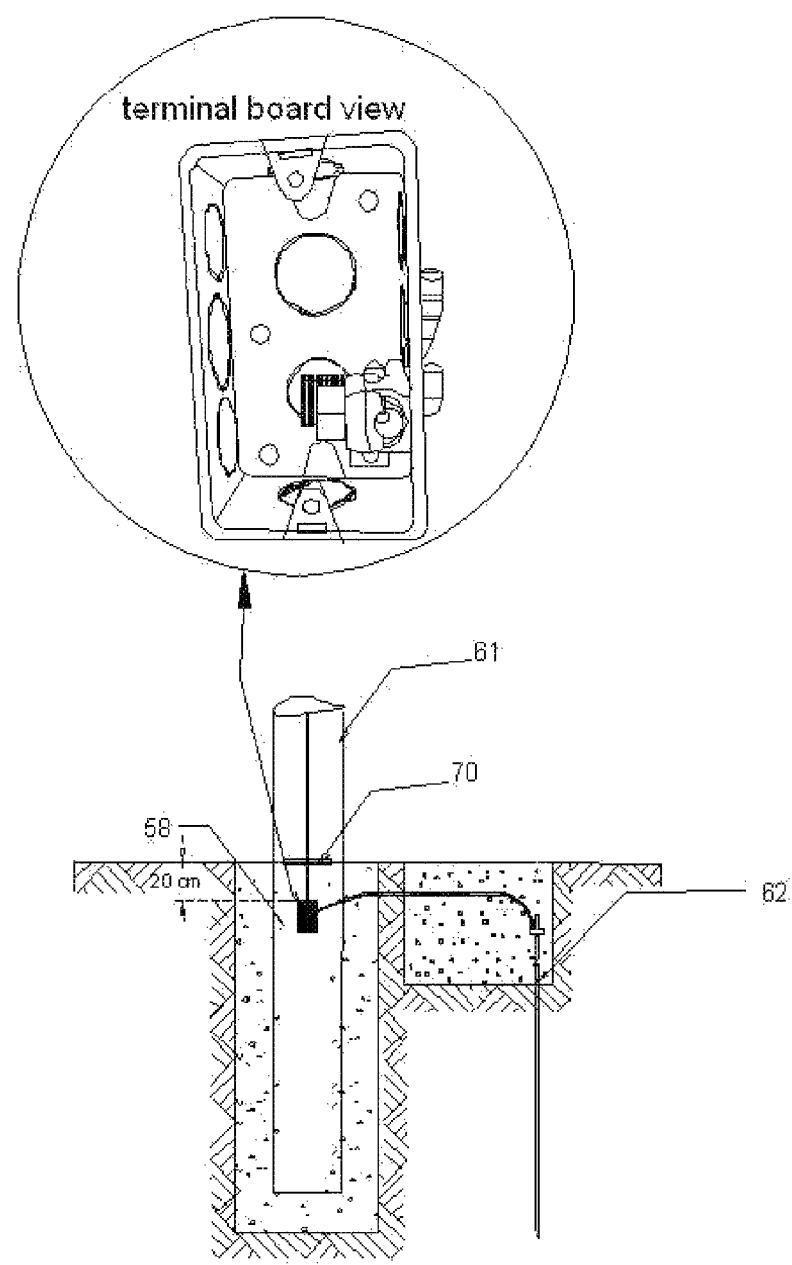
FIGURE Nº 7

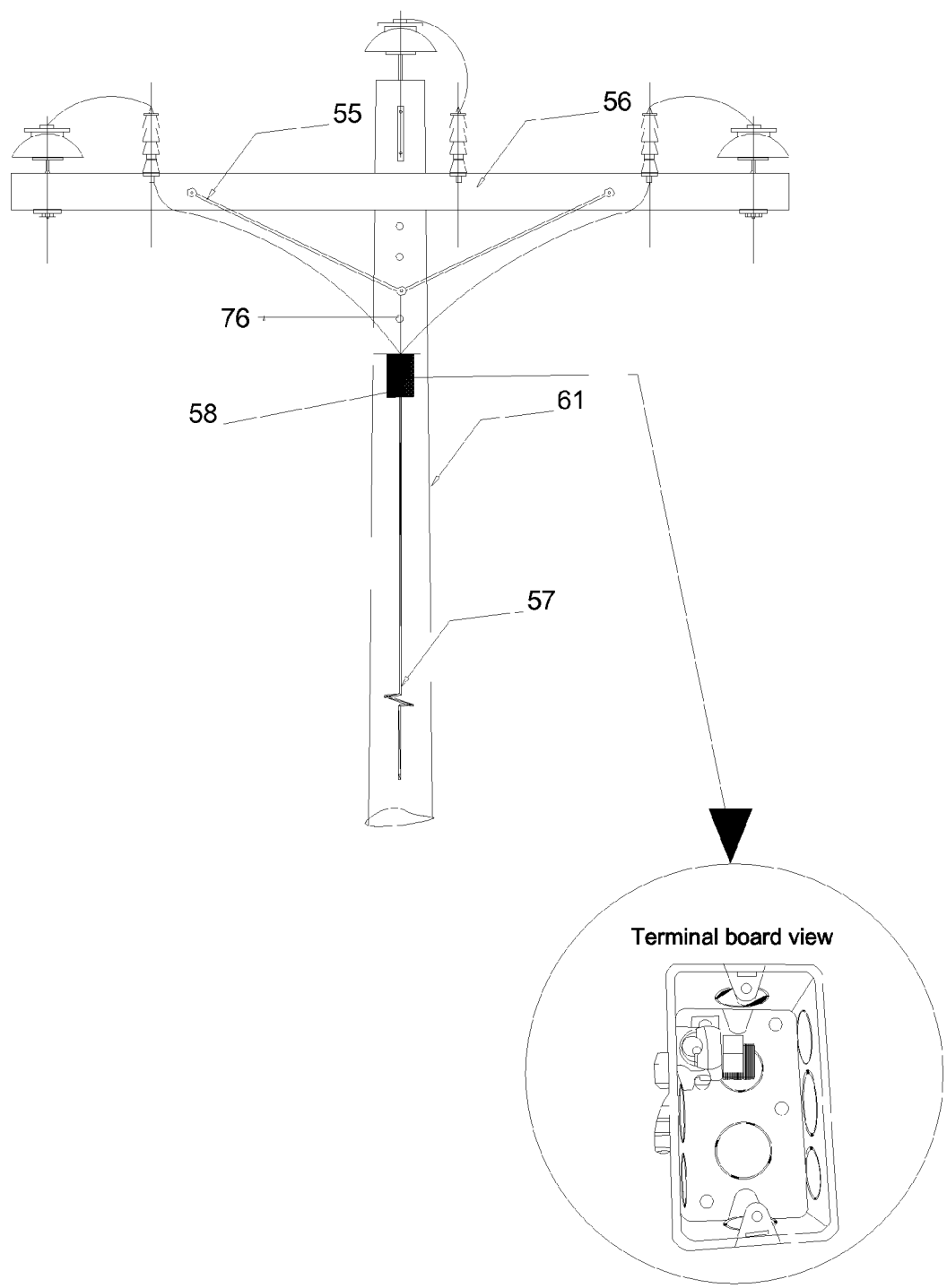
FIGURE N° 8

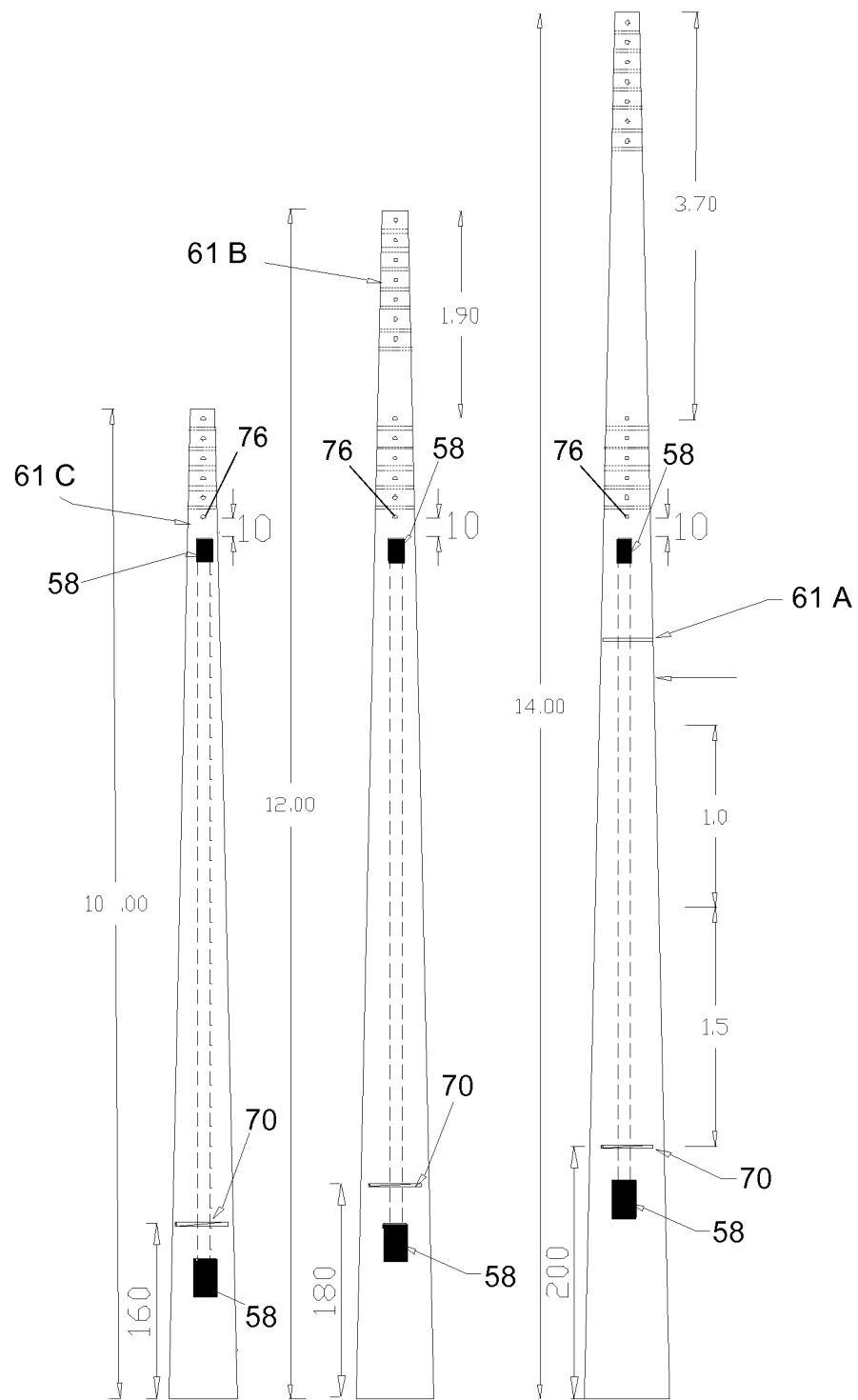
FIGURE N° 9

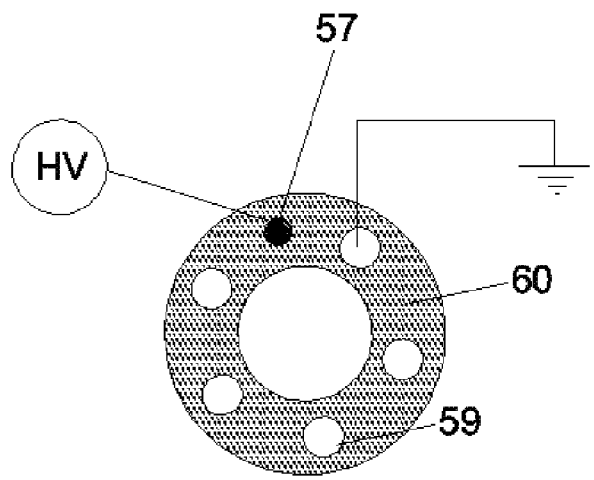
FIGURE Nº 10
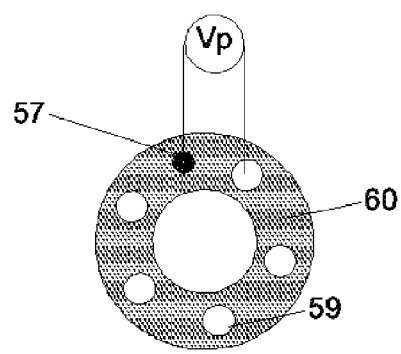
FIGURE Nº 11

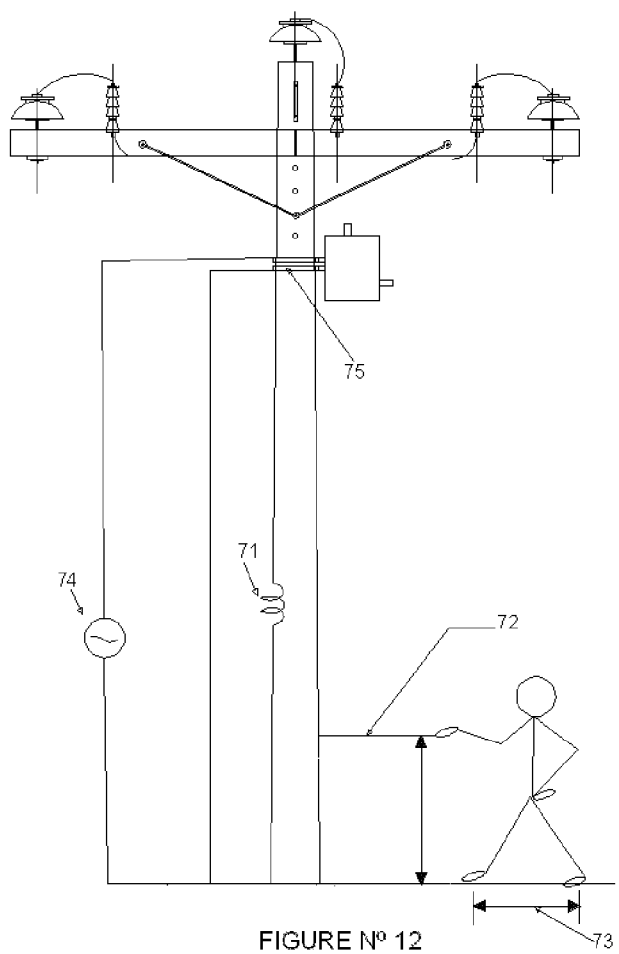
FIGURE Nº 12

ELECTRIC ENERGY DISTRIBUTION POLE WITH INCORPORATED GROUND SYSTEM

This application is a National Stage Application of PCT/IB2009/055631, filed 9 Dec. 2009, which claims benefit of Ser. No. 08-131.626, filed 11 Dec. 2008 in Colombia and which applications are incorporated herein by reference. To the extent appropriate, a claim of priority is made to each of the above disclosed applications.

OBJECT OF THE INVENTION

The purpose of the present invention is to provide poles to be used in the electric energy distribution system having the ground system incorporated within its structure.

BACKGROUND OF THE INVENTION

The ground system is a set of conducting elements of a specific electrical system, which do not have interruptions and which connect the electrical equipment to the terrain or a metallic mass. It comprises the ground and the equipotential network of wires that normally do not conduct current.

In general, every electrical installation, from the generation, transformation, transmission, distribution, to the final user, must include a ground system, for protecting the equipment and the people from surges and electric shocks.

The main functions of the ground system are: guaranteeing safety conditions to living organisms, allowing the protection equipment to clear failures quickly, serving as a reference to the electrical system, conducting and dissipating the leakage, electrostatic and lightening flash currents with sufficient capacity, transmitting half wave and long wave radiofrequency signals and making a low resistance connection to the ground and with reference point of the equipment (Internal Regulations for Electrical Installations, RETIE, Ministry of Energy and Mines, Colombia, Apr. 2, 2007, Article 15).

In the aerial systems of electric energy distribution in Medium Voltage (for example, 34500 Volts, 13200 Volts or 11400 Volts), where there are voltage transforming elements or transformers, a strongly grounded system must be guaranteed for the protection of the equipment. In turn, the aerial networks of low voltage commonly have multigrounded systems with installation of uniform ground leads, for example, each 3 or 4 spans ahead, depending on the values of reactance and resistance typical of the circuit.

Said ground system must have a suitable lead that, in case of a failure, guarantees that there are no by-pass voltages (potential difference existing between two points of the surface of the terrain, separated by a distance of about one meter), contact voltages (potential difference existing between a grounded metallic structure and a point of the surface of the terrain by a distance of a meter) or transferred voltages, exceeding the thresholds that can be tolerated by a human being.

The ground system traditionally used in the electrical distribution network uses as ground lead a copper wire, which is installed to the exterior of the pole with different elements and accessories for subjection. FIG. 1 illustrates the traditional system of ground lead in which the copper wire (50) introduced into a galvanized steel tube (52) is installed in the exterior of the pole (54), through the use of steel braces (51). The use of the galvanized steel tube helps protecting the ground lead wire, and isolates it avoiding a possible contact voltage.

This type of ground system requires the additional assembly of elements after the installation of the pole, which implies an increase in the time and cost of the installation. In addition to the above, the elements of the system are exposed, contributing to visual contamination, and being easily prone to stealing, which implies extra costs for the replacement of the ground system, and possible damages in electrical and electronic equipment installed on the poles (when it is the case), or malfunctioning of the electric system causing a loss in the continuity of the service.

An explored alternative to solve this problem has been installing the ground lead inside the inner cavity of the pole. In this type of system, the lead may or may not be introduced in a galvanized steel tube, and in the upper and lower section of the pole two orifices are used, through which the lead wire passes and the connections to the system and the ground electrode are made. However, this system also requires extra time after installation, the use of additional elements to fix the lead and the lead wire is exposed in the upper and lower sections of the pole, prone to stealing. Field tests performed in distribution systems have demonstrated that, in the ground systems where the lead is introduced in the inner cavity of the pole, said lead has been easily stolen.

The patent document JP2006296113 discloses a ground method that allows leads not to protrude of the surface of the pole. Said method consists in using distribution poles including a longitudinal groove in their surface, through which the leads pass. In this manner, the leads are less exposed, being easier to perform works on the pole in service. However, although this system avoids an excessive protrusion of the leads in the surface of the pole, said lead is exposed, requires additional fastening elements and is likewise anyways, prone to extraction.

Therefore, in the technical field, there is a need for providing a safe and efficient ground system for electric energy distribution poles, which does not imply additional steps in the pole installation and that effectively prevents the extraction of the lead.

SUMMARY OF THE INVENTION

The present invention is oriented to solve existent problems in the ground systems of aerial networks of electric energy distribution, providing a pole with an incorporated ground system. Said pole has a ground lead embedded in its structure, and two connection terminal boards fitted in its upper and lower sections.

This ground system completely avoids the subtraction of the lead, is effective in the grounding and ensures the efficient performance of the electrical distribution system by guaranteeing an effective connection to the ground system with operation, protection and control elements that are installed in the distribution network.

BRIEF DESCRIPTION OF THE DRAWINGS

FIG. 1 illustrates the traditional ground system where, the ground lead wire is installed in the outer section of the pole.

FIG. 2 shows the front view of the pole with incorporated ground system of the invention and the plan view of a preferred embodiment of the invention.

FIG. 3 shows the location of the ground lead wire in a preferred embodiment of the invention, together with the strands of the structure of the pole.

FIG. 4 illustrates the location of the ground lead wire before filling with concrete the building mold of the pole.

FIG. 5 shows the structure of the ground lead wire.

FIG. 6 is the inner view of the connection terminal board.

FIG. 7 shows the location of the connection terminal board installed in the lower section of the pole, connected to the ground rod.

FIG. 8 shows the connection terminal board installed in the upper part of the pole.

FIG. 9 shows the location of the connection terminal boards in poles of different heights.

FIG. 10 corresponds to a scheme of the diagram of the test Flame voltage to voltage impulse of a pole.

FIG. 11 shows a scheme of the diagram of the test Disruptive voltage at industrial frequency.

FIG. 12 illustrates the diagram of the test Bypass voltage and contact voltage to alternate voltage at effective industrial frequency to the ground system with operation, protection and control elements installed in the network.

DETAILED DESCRIPTION OF THE INVENTION

The traditional ground systems of the electric energy distribution lines (FIG. 1) include a lead made of copper (50) that is attached to the outer part of the pole, and use an additional series of elements to protect (52) and fasten the lead (51). This system requires additional time for the installation of the pole, cost overruns in the fastening and protection elements, and allows the lead wire to be easily extracted, generating a potential risk of failure in the electrical supply, or in network equipment.

The present invention provides a solution to these problems by providing a pole (61) with an incorporated ground system (FIG. 2). Said pole includes the ground lead (57) embedded in its structure, and two connection terminal boards (58) fitted in the upper and lower sections.

FIG. 2, shows a front view of the ground system of the pole of the invention, and a plan view of a preferred pole of the invention, made of concrete. Said plan view shows how the ground lead wire (57) is located between the longitudinal strands (59) (steel wires conforming a part of the structural reinforcement of the concrete pole) of the structural shell of the pole, without being in contact with the steel of the structure and being embedded in the concrete (60).

FIG. 3, shows the connectivity of the ground lead wire (57) with the connection terminal boards fitted (58) in the concrete pole (61).

In this preferred embodiment of the invention, the lead (57) is incorporated to the structure before the concrete setting in the construction molds. As shown in FIG. 4, the ground lead (57) is fixed before the casting of the concrete in the construction mold (63) to the transversal strands (64) of the inner structure of the pole by means of plastic tie offs, which totally avoids the metal-metal contact preventing the formation of a corrosion focus by galvanic pair.

In other embodiments of the invention, the material for manufacturing the pole may be any plastic material, including any plastic material reinforced with fibers. In these embodiments the lead (57) is introduced at the moment of manufacturing the pole being embedded in its structure.

The ground lead (57) included in the poles of the invention may be installed in electric energy distribution poles of any height.

The ground lead wire in general may be of any electricity conducting metallic material complying with the requirements of the ground for the distribution system.

In a preferred embodiment of the invention the wire is made of copper No. 4 AWG.

Within the preferred embodiment of the invention, in which the pole is made of concrete, it is preferred the use of a coated wire as the one shown in FIG. 5.

Said coating has the function of preventing the conducting material configuring the wire to be exposed and to directly contact the salts of the concrete, which with time may lead to corrosion of the wire and therefore a decrease in the efficiency of the conduction to the ground.

In a preferred embodiment of this invention the ground lead wire is constituted of inner copper filaments (66), coated with PVC (65).

The second element in the ground system incorporated in the poles of the invention is the connection terminal board (58). In FIG. 6 it is shown a scheme of the connection terminal board preferably used in the poles of the invention.

Said terminal board is installed in the upper and lower section of the pole and is constituted by a connection terminal of the spade type (69), a flat connector of the eye service type (68), which is constituted by two nuts and two washers and a main screw, and a plastic box (67) supporting and linking the connection terminal (69) and the service type connector (68).

In general, the inner constituents of the connection terminal boards: connectors, washers, threads, terminals and screws, may be of any electricity conducting material commonly used in grounds, with the proviso that some material does not create a galvanic pair with the ground wire or any other component of the connection element or terminal board.

In a preferred embodiment of the invention the eye service type bronze flat connector (68) and the main screw are made of bronze, whereas the washers and the threads are made of copper.

For configuring the ground system included in the pole of the invention, the ground lead wire (57), has two ways which will be interconnected with the connection terminal board (58) in the upper and lower section of the pole, guaranteeing the continuity in the ground of the elements of the distribution network.

The connection terminal boards are simultaneously installed to the ground lead wire, when the pole is manufactures. In this way, said terminal boards are fitted in the pole structure, leaving the connector (68) exposed. This configuration enables the connection to the control and operation equipment used in the aerial networks of electric distribution, such as reclosers, transformers, circuit breakers, splitters, lightning conductors, among others.

The terminal board of the lower section (58) is installed from 15 to 20 cm. under the burying line (70) (FIG. 7) of the pole (61), which is generally painted on its surface. The connector (68) is connected to the ground rod (62) that is buried next to the pole.

On the other hand, the connection terminal board of the upper part (58) is located 10 cm. under the last perforation of the pole 76 (FIG. 8). These perforations are used for installing the different elements that are part of the electric energy distribution network, such as diagonals (55) and crosses (56).

FIG. 9 shows the location of the connection terminal boards in poles of different heights.

One of the main advantages of the invention is that it prevents the ground lead wire (57) to be substracted from the pole, and therefore improves the performance of the electric energy distribution system by guaranteeing an effective connection to the ground system with operation, protection and control means installed in the network, such as reclosers, (electronic control cards), transformers, overvoltage dischargers, and guarantees the electric safety both for the equipment and the people that may be in contact with the network. Consequently, there is a notable improvement in the service continuity measurement index that are normally registered by the different electric energy distribution companies.

Additionally, the poles of the invention enable lowering the costs of the installation of the distribution network, because they eliminate the need for the use of additional elements such as bracers and ducts, among others, and reduce the labor time in the installation of the pole for its service.

Likewise, the invention advantageously reduces the visual contamination linked to the traditional system, because no part of the ground system in the poles of the invention is exposed.

The efficiency in the ground system of the pole of the invention has been proved by electrical tests, following the procedures contemplated by standard IEC60-1 "High voltage test techniques" 1989.

Flame Voltage to Voltage Impulse of a Pole Test

Voltage impulses were applied to a set of three 2.5 m aluminium tubes simulating three conductors in a pole (FIG. 10), installed in the terrain, with its metallic fittings connected to the ground, and with a consistent ground in a copper rod buried next to the pole. Standard IEC60-1 "High voltage test techniques", 1989, was used as a reference for calculating 50% breakdown voltage.

Average temperature: 19.5±0.5° C., Average relative humidity: 58.5+2.5% Instrument used: Thermo-hygrometer AEMC Instruments, Model: CA846, SN: IOI8CBCY, Calibration certificate: WO#4131 18 Hayes Instrument Service, Inc., Module GIT—Electrical Assays Laboratory, Voltage and Current Measurement and Control instrument HAEFELY, Ref. DIAS.

Capacitive divider HAEFELY, 1200 kV, SN: WOA554755, calibration certificate: LABEO5CC7O2, transformation relation: 218.4. 7.5 kVA HAEFELY Transformer.

Results: The 50% breakdown voltage, corrected for an altitude of less than 1000 m for the sample was V(50%)=149 kV, for this assay. Standard deviation of the corrected data (kV) 3.68

Disruptive Voltage at Industrial Frequency

Alternating voltage was applied at industrial frequency between the embedded wire and the steel strands that configure the inner mesh of the pole support, increasing voltage from 0 Volts for causing pole disruption at a constant increase rate for a set of four samples of the same pole (FIG. 11).

Results: The average disruptive voltage, calculated with the measurements was 17.09 kV.

By-Pass Voltage to Voltage Impulse

Voltage impulses were applied between the grounded metallic fittings by means of the ground lead wire embedded in the concrete of the poles of the invention that were tested and the ground of the laboratory facilities. Voltage impulses of different amplitudes were applied and the voltage between the terminals of a 1000 ohm resistance connected between a 200 $cm^2$ aluminium foil electrode on the pole and 200 $cm^2$ circular bases separated 1 m between each other and located 1 m away from the pole, with a weight of 50 kg and located on the terrain adjacent to the pole free from weed and stones, was measured.

Results: With applied voltages between 10 kV and 62.4 kV peak voltage values from 2.08 to 22 kV were obtained, from which it is deduced that the isolation conditions are improved with regard to an observer close to the pole compared to the traditional external ground system.

By-Pass Voltage to Alternate Voltage at Industrial Frequency

An alternate voltage signal (74) of industrial frequency was applied by means of an autotransformer of 18 kVA, 600V, 30A applied between the metallic fittings of the pole (75), ground of the poles of the invention installed in the test area (FIG. 12) and the ground (71) of the structure of the building where the test was performed. The current injected to the pole, the autotransformer voltage and the contact voltage (72) were registered by means of a digital oscilloscope for each one of the two studied poles.

Results: With industrial frequency voltage applied values from 150V to 500 V contact voltage values between 0.18 V and 7.34 V were obtained.

General Results of the Tests

According to the electric tests performed for the poles of the invention, it was found that the ground system included within its structure completely satisfies the electric safety parameters required for the electric energy distribution network.

These tests also proved that the poles of the invention may be used in any voltage type and level of aerial networks of electric energy distribution.

The invention claimed is:

1. An electric energy distribution pole with incorporated ground system, said pole comprising:
    a ground lead embedded in its structure; and
    two connection terminal boards fitted in the pole,
    wherein the pole is made of concrete,
    wherein the ground lead is a wire made of an electricity conducting material, and is fixed to traversal strands of an inner structure of the pole by plastic tie offs, so that the wire of the ground lead is located between structural strands of the pole, and
    wherein the connection terminal boards are fitted in an upper and a lower section of the pole and are installed simultaneously to the ground lead, and each board is constituted by a connection terminal of a spade type, a flat connector of an eye service type, which is constituted by two nuts and two washers and a main screw, and a plastic box supporting and linking the connection terminal and the service type connector.

2. The electric energy distribution pole of claim 1, wherein inner constituents of the connection terminal boards are made of an electricity conducting material that does not form a galvanic pair with the ground lead or with any other connection element.

3. The electric energy distribution pole of claim 1, wherein a connection terminal board fitted in the upper section of the pole is located under a last perforation of the pole.

4. The electric energy distribution pole of claim 1, wherein the lower connection terminal board is located under a burying line of the pole.

5. The electric energy distribution pole of claim 1, wherein the ground lead is a coated wire.

6. The electric energy distribution pole of claim 1, wherein the ground lead is a wire of copper filaments coated with PVC.

\* \* \* \* \*